July 25, 1972   R. M. LEIRVIK   3,679,545
NUCLEAR FUEL ROD
Filed June 2, 1969   3 Sheets-Sheet 1
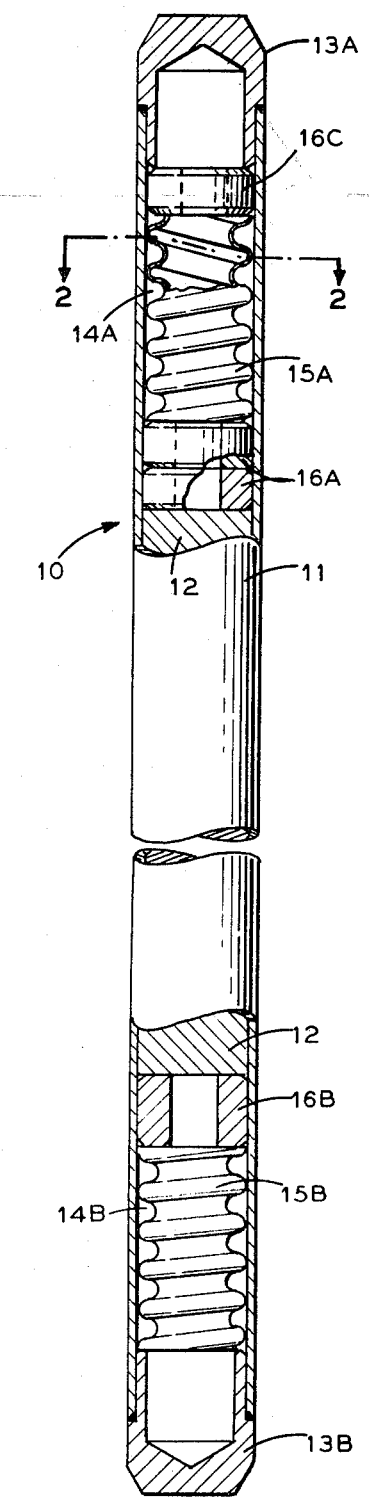
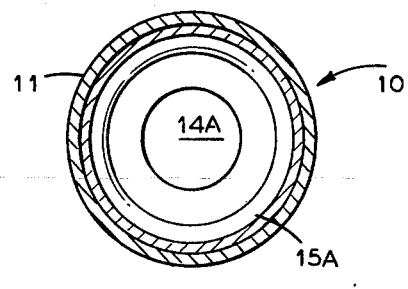
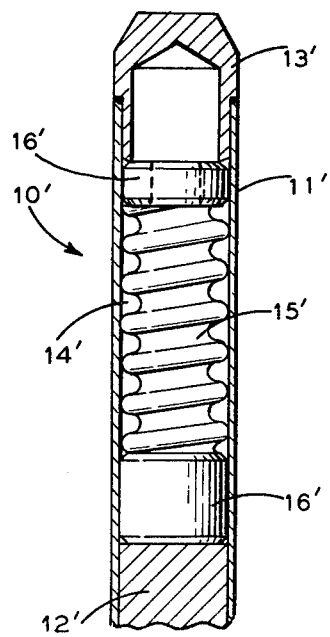
INVENTOR.
Raymond M. Leirvik
BY
ATTORNEY July 25, 1972  R. M. LEIRVIK  3,679,545

NUCLEAR FUEL ROD

Filed June 2, 1969  3 Sheets-Sheet 2

United States Patent Office 3,679,545
Patented July 25, 1972

3,679,545
NUCLEAR FUEL ROD
Raymond M. Leirvik, Lynchburg, Va., assignor to The Babcock & Wilcox Company, New York, N.Y.
Filed June 2, 1969, Ser. No. 829,629
Int. Cl. G21c 3/18
U.S. Cl. 176—68                7 Claims

ABSTRACT OF THE DISCLOSURE

A nuclear reactor core element utilizing one or more corrugated tubular spacer members that resiliently support and locate within a sealed cladding tube either a body of nuclear fuel material or a body of neutron absorber material. Each corrugated spacer member is located in a plenum zone wthin the cladding tube and radially reinforces the tube wall section around such plenum zone against collapse by external fluid pressure.

BACKGROUND AND SUMMARY OF THE INVENTION

This invention relates in general to the design of nuclear reactor cores, and more particularly to a core element construction that is adaptable to the manufacture of both fuel rods and control rods.

Basically, the core element construction of the invention provides one or more corrugated tubular spacer members that resiliently support within a sealed cladding tube either a body of nuclear fuel material or a body of neutron absorber material so as to positively locate the body with respect to the ends of the tube and accommodate the axil expansion on such fuel or neutron absorber body as ordinarily occurs with the temperature and irradiation levels within an operating reactor. Each corrugated spacer member is located in a plenum zone within the cladding tube and radially reinforces the tube wall section around such plenum zone against collapse by external fluid pressure. This permits the use of cladding tubes having smaller wall thicknesses than could be used without the internal reinforcement derived from the corrugated spacer members.

In the prior art there are several varieties of sheated or clad nuclear fuel rods and control rods. For further details on the state of the art, reference may be had to U.S. Pat. No. 3,378,458 issued to W. T. Ross et al., U.S. Pat. No. 3,262,860 issued to E. L. Zebroski, and U.S. Pat. No. 3,009,869 issued to C. H. Bassett, and U.S. Pat. No. 3,365,371 issued to J. L. Lass et al.

As is well know in the prior art, cladding of nuclear fuel and neutron absorber materials in reactor cores that are cooled by fluids, whether gas or liquid, is done for the purpose of preventing radioactive contamination of the coolant fluid and such equipment as it passes through in the process of deriving useful power output from the reactor.

Cladding material, because of the severe environmental conditions to which it is subjected, is a relatively expensive commodity and large quantities of it are required for construction of each reactor core. Furthermore, the cladding material itself absorbs a portion of the neutron flux produced within the core, and hence for a given design condition, a greater effective amount of nuclear fuel material is required for the core, this necessitates either an increase in core size, or if that is not permissible then an increase in the level of fuel enrichment.

With fuel rods wherein the cladding tube is sealed at both ends a certain minimum volume plenum zone must be provided to allow fuel expansion and to contain the fission gases released during reactor operation. Thus, in the case of sealed fuel rods it is not possible to depend upon the fuel material itself for internally reinforcing the cladding tube along its entire length.

In the case of control rods, even though containment of fission gas may not be required, there still exists the need to position and hold close tolerances on the location of the neutron absorber material with respect to the cladding tube ends during axial acceleration loads encountered in handling, shipping, and reactor operation. Also, the neutron absorber material undergoes axial expansion just as does nuclear fuel.

Unlike the fuel rods, each control rod is a critical item with respect to reactor control and safe shutdown. Control rod collapse with its resulting distortion could prevent full insertion into the core, or once inserted, could prevent further movement inward or outward. Since the control rod is usually a dynamic component ordinarily having a higher residence time in the reactor than a typical fuel rod, the wall thickness of control rod cladding tubes is chosen so as to withstand the anticipated fluid pressure differential over the entire useful life span of the control rod, taking into account such reductions in thickness as may occur due to sliding friction and corrosion.

While it has been known in the prior art to utilize helical coil wire springs to provide for expansion and axial support for the fuel within a cladding tube, wire springs can not be relied upon to furnish the desired radial support and reinforcement to the cladding because of the tendency for the individual convolutions of wire springs to veer out of their helical configurations when subjected to radial loads. The spacers used in the invention are preferably helically corrugated tube sections and are not subject to this inherent instability under radial loading, because in the case of corrugated tubing there is a continuous membrane that maintains each convolution in a stable mode relative to the axial center line, and by judicious sizing of the corrugations to the inside diameter of the clad tube, substantial radial reinforcement of the tube is provided.

These corrugated spacers are preferably made of metal such as stainless steel. To thermally insulate the steel corrugated spacers from the fuel, one or more ceramic spacer members are slidably interposed within the clad tube between the corrugated spacers and adjacent boundary of the fuel body.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention.

BRIEF DESCRIPTION OF THE DRAWING

In the drawing:
FIG. 1 is a longitudinal sectional view of a nuclear fuel rod constructed in accordance with a preferred embodiment of the invention.
FIG. 2 is a transverse cross-sectional view of the nuclear fuel rod shown in FIG. 1 as taken along line 2—2.
FIG. 3 is a longitudinal sectional view of a portion of a nuclear fuel rod constructed according to another embodiment of the invention and illustrating the use of a ceramic insulator between the fuel and a typical corrugated spacer.

DESCRIPTION OF THE PREFERRED EMBODIMENTS OF THE INVENTION

Figure 4:
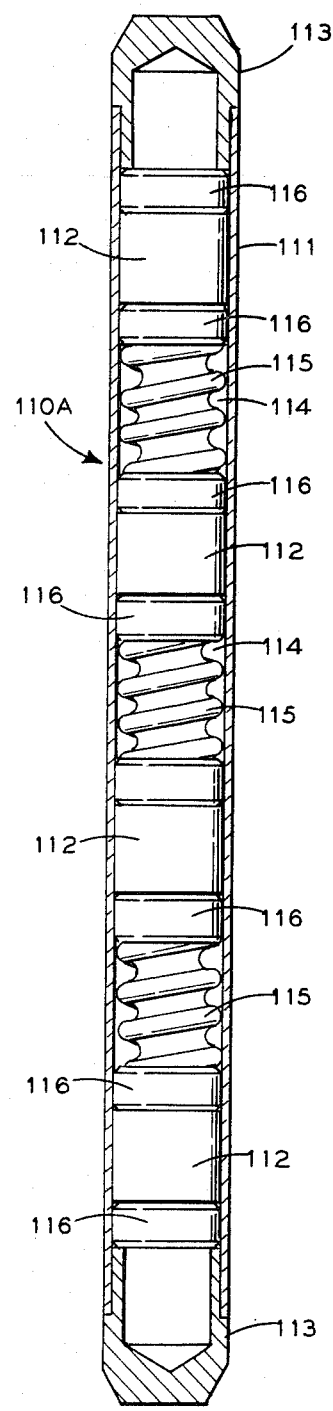
FIG. 4 is a longitudinal sectional view of a nuclear fuel rod constructed in accordance with a further embodiment of the invention and featuring a plurality of nuclear fuel bodies resiliently supported in axially spaced-apart relation.

FIGS. 1 and 2 exemplify a nuclear fuel rod 10 in which a quantity of fissionable material is compacted into the central length portion of a metallic cladding tube 11 to form a columnar nuclear fuel body 12.

Tube 11 is sealed and at each of its opposite ends by metal caps 13A, 13B connected respectively to the upper and lower ends of tube 11 and seal welded thereto.

Fuel body 12 is so positioned in relation to the extremities of tube 11 as to define plenum zones 14A, 14B each extending axially outward from a corresponding endwise boundary of fuel body 12. These plenum zones 14A and 14B serve to contain at acceptable pressure limits fission gases released from the fuel body 12 during the normal course of reactor operation.

The intended location of the fuel body 12 with respect to the ends of tube 11 is established by means of tandem combinations of spacers 15A, 15B, 16A, 16B and 16C disposed within plenum zones 14A, 14B and slidable relative to tube 11. Spacers 15A and 15B are metallic tubular sections that are helically corrugated and consequently resiliently compressible along their axial directions to provide resilient support for the fuel 12 and accommodate the axial expansion thereof as occurs during normal reactor operation. Because of their corrugated configuration, spacers 15A, 15B have a relatively high stiffness with respect to radially directed loads as compared with their stiffness to axial loads. This combination of rigidity features is utilized in the invention to prevent collapse of the cladding tube 11 around the plenum zones 14A and 14B from external fluid pressures acting thereupon during the course of reactor operation and particularly when the fission gas pressure in such plenum zones 14A, 14B has not built up to a level providing any significant counterbalance for the external pressures. The corrugated spacers 15A and 15B have outside diameters sized such that, under normal room temperatures and atmospheric pressure conditions of fuel rod 10 fabrication, these spacers 15A, 15B can be slidably inserted into tube 11, but with a limited radial clearance so that they engage the cladding tube 11 to prevent any further inward deformation thereof beyond a predetermined limit. Thus, in the manufacture of the fuel rod 10, the tolerances on the outside diameter of spacers 15A, 15B and the inside diameter of tube 11 are such that the resulting gaps between the inside surface of tube 11 and spacers 15A, 15B will not exceed acceptable ovality limits before the tube 11 bears against spacers 15A, 15B and then is supported thereby against any further collapse deformation.

Spacers 16A, 16B and 16C are ceramic sleeve type spacers and can have the same or different axial lengths as needed for the fabrication of a particular fuel rod 10. During the course of normal reactor operation, the fuel 12 becomes hot enough to adversely affect the resiliency properties of most metals that would be used for making the corrugated spacers 15A and 15B. To avoid such problem, the ceramic spacers 16A and 16B are inserted between the ends of the fuel body 12 and corrugated spacers 15A and 15B respectively to thermally insulate such spacers 15A, 15B from the heat of fuel body 12.

Ceramic spacer 16C serves a similar insulating function, namely to insulate corrugated spacer 15A from the heat developed when cap 13A is seal welded to tube 11. If desired, another ceramic spacer (not shown) similar to ceramic spacer 16C can be interposed between cap 13B and corrugated spacer 15B. However, this is not necessary if in the fabrication of fuel rod 10, cap 13B is seal welded to tube 11 before it is loaded with the fuel body 12 and spacers 15A, 15B, 16A, 16B and 16C.

In the manufacture of fuel rods 10 having a fuel body 12 located between a pair of corrugated spacers 15A, 15B, it may sometimes be desirable to use spacers 15A, 15B that have different axial stiffness coefficients, or spring constants for the purpose of achieving a preferential fuel body 12 expansion toward one or the other end of fuel rod 10.

For example, where it is desired to accommodate substantially all axial expansion of the fuel body 12 toward that end of rod 10 sealed by cap 13A, i.e. maintain a fixed axial distance between the end cap 13A and fuel body 12 boundary adjacent thereto, the spacer 15B can be made with an axial spring constant many times higher than that of spacer 15A. However, the spring constant of spacer 15B should be chosen such that if for some reason the fuel body 12 should bind or otherwise lock onto tube 11, spacer 15B will compress to relieve such expansion at a load not exceeding the tensile strength of tube 11.

In FIG. 1 there is illustrated for purposes of example a single ceramic spacer 16B in plenum zone 14B, and in plenum zone 14A a pair of ceramic spacers 16A, each of smaller axial length than spacer 16B. It should be understood that the number of ceramic spacers 16A, 16B, 16C their individual axial lengths and order of arrangement in plenum zones such 14A, 14B can be varied as needed to suit the requirements of a particular fuel rod 10 design.

The choice of sleeve type, or annular ceramic spacers 16A, 16B, 16C offers a certain advantage in expediting the fabrication of fuel rods 10 since such spacers 16A, 16B, 16C can be stacked upon a guide rod (not shown) to facilitate their insertion into plenum zones 14A, 14B.

However, as is exemplified in FIG. 3, other types of thermally insulating spacers can be substituted for the annular spacers 16A, 16B, 16C in the manufacture of a fuel rod 10' that is otherwise similar to the fuel rod 10.

In the plenum zone 14' of fuel rod 10' there is interposed between the inside end of metal corrugated spacer 15' and fuel body 12' a thermally insulating ceramic spacer 16' in the form of a generally cylindrical solid plug. Between the outside end of spacer 15' and the end cap 13' there is installed a ceramic spacer 16C' which is similar to and serves the same purpose as spacer 16C in fuel rod 10.

Figure 5:
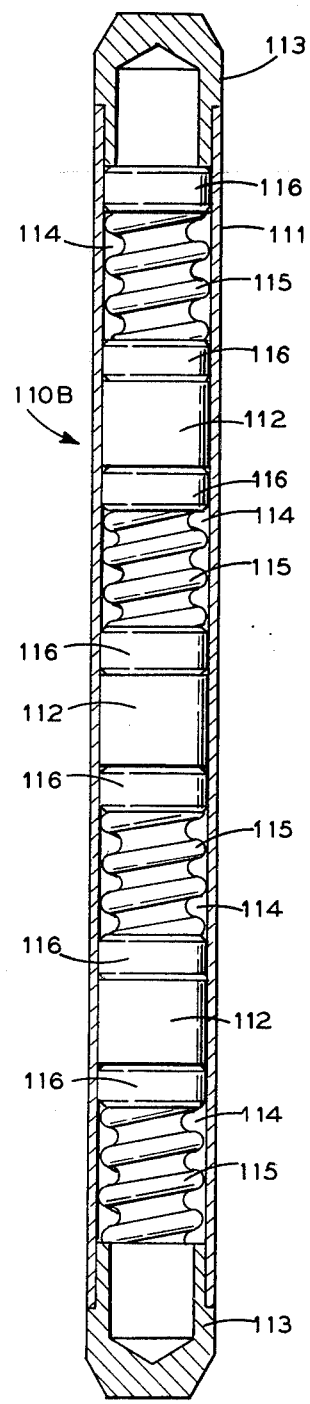
FIG. 5 is a longitudinal sectional view of a nuclear fuel rod somewhat similar to that shown in FIG. 4 but has multiple fuel bodies arranged in a different order according to a modified embodiment of the invention.
Figure 6:
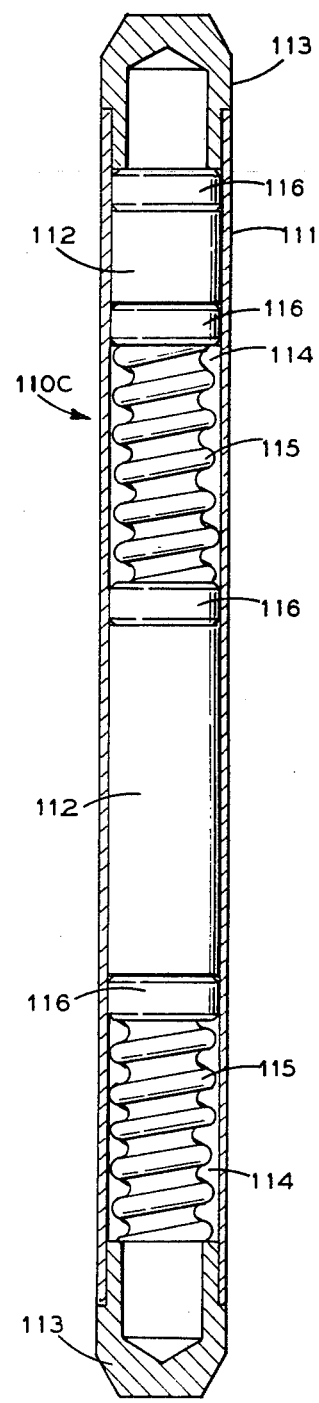
FIG. 6 is a longitudinal sectional view of a nuclear fuel rod of the invention having multiple fuel bodies arranged differently from those shown in FIGS. 4 and 5.

FIGS. 4, 5, and 6 illustrate nuclear fuel rods 110A, 110B, 110C constructed in accordance with the invention, each having a plurality of nuclear fuel bodies 112 positioned within a cladding tube 111 in axially spaced-apart relation to one another such that they define within the tube 111 a corresponding plurality of plenum zones 114. Within each plenum zone 114 is disposed a metallic corrugated tubular spacer 115 similar to the spacers 15A, 15B in the fuel rod 10. The corrugated spacers 115 are resiliently compressible along their axial directions to resiliently support and locate the fuel bodies 112 in the intended axially spaced-apart relationship, and accommodate for the axial expansion of the said fuel bodies 112. As in the fuel rod 10, the corrugated spacers 115 are dimensioned to engage the inside surface of the cladding tube 111 to radially reinforce it around corresponding plenum zones 114 so as to prevent collapse by external fluid pressures. Here again, there is provided a thermally insulating ceramic spacer 116 between each fuel body 112 boundary and the adjacent corrugated spacer 115 to protect same from overheating by the fuel body 112.

The fuel rods 110A, 110B, 110C essentially differ only in the number and arrangement of their respective fuel bodies 112.

Fuel rod 110A shown in FIG. 4 has four fuel bodies 112 arranged so as to establish three plenum zones 114 intermediately located with respect to the end caps 113 which seal the tube 111. These end caps 113 are metal, and therefore to prevent overheating as might occur if they were in direct contact with the fuel, a ceramic spacer 116 is placed between each end-adjacent fuel body 112 and the corresponding cap 113.

Fuel rod 110B shown in FIG. 5 has three fuel bodies 112 arranged so as to define four plenum zones 114, two of which are intermediately located with respect to the ends of tube 111 and two of which are directly adjoining the capped ends of tube 111. Since it is contemplated that in the fabrication of fuel rod 110B, one of the end caps 113 will be seal welded to tube 111 before it is loaded with fuel bodies 112, corrugated spacers 115 and insulating spacers 116, there is provided only at one end of tube 111 an insulating spacer 116 between the end cap 113 and adjacent corrugated spacer 115 to protect same against overheat damage when such second cap 113 is seal welded to tube 111.

Fuel rod 110C shown in FIG. 6 has two fuel bodies 112 arranged so as to establish two plenum zones 114, one of which is intermediately located with respect to the ends of tube 111 and the other of which directly adjoining a capped end thereof. Again, it is contemplated that the end cap 113 at the end plenum zone 114 will be seal welded to tube 111 before final loading so that there is no necessity for a ceramic spacer 116 between the corrugated spacer 115 in the end plenum zone 114 and the cap 113 associated therewith. Accordingly, at the opposite end of tube 111 there in provided a ceramic insulating spacer 116 to protect the metal cap 113 at that end from overheating by adjacent fuel body 112. Of course, if the cap 113 adjacent to the end fuel body 112 were to be seal welded first and then tube 111 loaded from the opposite end, a ceramic insulating spacer (not shown) would be inserted between such last welded cap 113 and the adjacent corrugated spacer 115.

Figure 7:
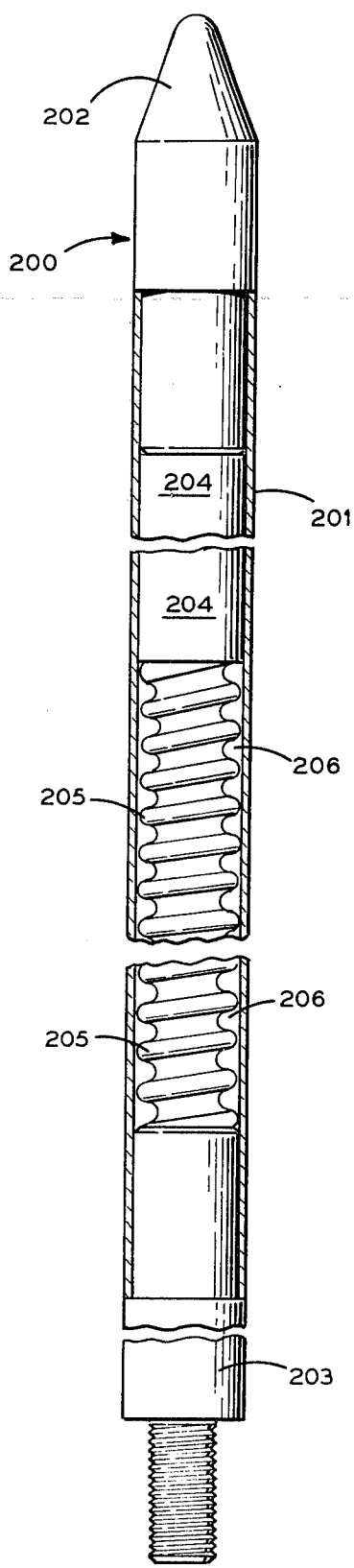
FIG. 7 is a longitudinally sectional view of a control rod constructed in accordance with the invention.

FIG. 7 shows how the concept of the invention is applied in the construction of a typical control rod 200 used in a nuclear reactor.

Control rod 200 has a metallic cladding tube 201 sealed at its in-pile end by a nose plug 202 and sealed at its out-pile end by a threaded connector plug 203.

Inside tube 201 there is slidably disposed a body 204 of neutron absorber material. Neutron absorber body 204 is held in bearing contact engagement with the inside end of nose plug 202 by a metallic corrugated tubular spacer 205 located in a plenum zone 206. Corrugated tubular spacer 205 is similar in design and function to the corrugated spacers 15A, 15B, and 115 previously described herein.

Before installation of plug 203, spacer 205 is axially compressed between neutron absorber body 204 and the inside end of plug 203 such that body 204 is held against plug 202 with a certain preload force and is therefore positively located with respect to the ends of control rod 200, while yet able to expand and contract without imposing any excessive strain upon tube 201 because of the resilient support afforded by spacer 205. As in the previously described embodiments of the invention, spacer 205 is dimensioned to engage cladding tube 201 so as to radially reinforce it against collapse around plenum zone 206 by external fluid pressures acting thereupon under normal reactor surface conditions.

As a guide to the artisan desirous of manufacturing nuclear fuel rods 10, 10', 110A, 110B, 110C and control rods 200, the cladding tube 11, 11', 111, 201 can be any suitable metallic material such as zircalloy, the corrugated spacers 15A, 15B, 205 can be stainless steel, and the ceramic spacers 16A, 16B, 16C, 16', 116 can be made of zirconium dioxide.

It has been found that the corrugated spacers 15A, 15B, 115, 205 are expediently made from stainless steel tube stock shaped upon a threaded forming mandrel (not shown). The number of corrugations per unit length, tube wall thickness, inside diameter, outside diameter, and other detail characteristics of these corrugated spacers can be established through the application of rountine engineering calculations, so as to provide the axial compressibility and radial rigidity required in each particular case, but yet minimize the volume displacement of the total materials used.

As to the choice of zirconium dioxide for the ceramic spacers 16A, 16B, 16C, 16', 116, it has been found that such material affords adequate strength and thermal insulation properties and can be made with sufficient porosity to store some of the fission gases released from the fuel, which in the case of fuel rod construction results in a conservation of total effective plenum zone volume.

While in accordance with the provisions of the statutes there is illustrated and described herein a specific embodiment of the invention, those skilled in the art will understand that changes may be made in the form of the invention covered by the claims, and that certain features of the invention may sometimes be used to advantage without a corresponding use of the other features.

What is claimed is:

1. A nuclear reactor core element which comprises a cladding tube sealed at each of its opposite ends, a body of material selected from the group consisting of nuclear fuel material and neutron absorber material disposed within a first axial length section thereof, and means for resiliently axially supporting said body within said tube and for radially reinforcing said tube along a second axial length section of said tube against collapse by external pressures acting thereupon, said means including a tubular spacer member having corrugations therein and disposed within said tube, said spacer being axially displaced from said body of material, and said spacer member being resiliently compressible along its axial direction and having an outer diameter substantially the same as the inner diameter of said tube.

2. A nuclear reactor core element according to claim 1 wherein said spacer member is helically corrugated.

3. A nuclear reactor core element according to claim 1 including a second body of material positioned within said tube in axially spaced-apart relationship with said body of material, and wherein said spacer member is disposed within the space intermediate said body of material and said second body of material.

4. A nuclear reactor core element according to claim 1 including a plurality of said bodies of material positioned within said tube in axially spaced apart relation to one another, and a plurality of corrugated tubular spacer member each disposed in the spaces intermediate said bodies of material.

5. A nuclear reactor core element according to claim 1, wherein said body of material is axially movable relative to the cladding tube and wherein said means includes a second corrugated spacer member positioned within said tube in axially spaced-apart relationship with said spacer member, said body of material being disposed within the space intermediate said spacer member and said second spacer member, said spacer members having different axial spring constants to achieve a predetermined axial displacement of said body of material for a given amount of axial expansion thereof.

6. A nuclear reactor core element according to claim 1, said means including at least one ceramic member disposed between the corrugated spacer member and said body of material to thermally insulate said corrugated spacer member therefrom.

7. A nuclear reactor core element according to claim 1, said means including a ceramic member disposed between the corrugated spacer member and one end of said cladding tube to thermally insulate said corrugated spacer member from said one end.

References Cited

UNITED STATES PATENTS

| | | | |
|---|---|---|---|
| 3,009,869 | 11/1961 | Bassett | 176—68 |
| 3,092,901 | 6/1963 | Sharples | 176—73 X |
| 3,129,140 | 4/1964 | Jacques-Andrestohr et al. | 176—73 X |
| 3,262,860 | 7/1966 | Zebroski | 176—68 X |
| 3,274,067 | 9/1966 | Greebler et al. | 176—73 X |
| 3,291,698 | 12/1966 | Fortescue | 176—68 |
| 3,310,474 | 3/1967 | Saunders | 176—73 X |
| 3,350,271 | 10/1967 | Maidment et al. | 176—19 |
| 3,357,893 | 12/1967 | Gatley et al. | 176—68 |
| 3,365,371 | 1/1968 | Lass et al. | 176—66 |
| 3,378,458 | 4/1968 | Ross et al. | 176—79 |

CARL D. QUARFORTH, Primary Examiner

G. G. SOLYST, Assistant Examiner

U.S. Cl. X.R.

176—73, 79, 86